United States Patent [19]

Shirakawa et al.

[11] 4,356,607
[45] Nov. 2, 1982

[54] METHOD OF PRODUCING TRIMMER CAPACITORS

[75] Inventors: Takashi Shirakawa, Morioka; Hiroshi Izumi, Tamayama, both of Japan

[73] Assignee: Alps Electric Co., Ltd., Tokyo, Japan

[21] Appl. No.: 174,227

[22] Filed: Jul. 31, 1980

[30] Foreign Application Priority Data

Aug. 1, 1979 [JP] Japan .................................. 54-98267

[51] Int. Cl.$^3$ .......................................... H01G 5/06
[52] U.S. Cl. .................................... 29/25.42; 361/293
[58] Field of Search ......................... 29/25.42; 361/293

[56] References Cited

U.S. PATENT DOCUMENTS

| 3,205,417 | 9/1965 | Maeda | 361/293 |
| 4,101,951 | 7/1978 | Kuze | 361/293 |

FOREIGN PATENT DOCUMENTS

| 807382 | 1/1959 | United Kingdom | 361/293 |
| 882405 | 11/1961 | United Kingdom | 361/293 |
| 966466 | 8/1964 | United Kingdom | |
| 2011181 | 7/1979 | United Kingdom | |

*Primary Examiner*—Elliot A. Goldberg
*Attorney, Agent, or Firm*—Guy W. Shoup; Gerard F. Dunne

[57] ABSTRACT

An insulating frame is formed by an insert mold such that a portion of a stator lead member is exposed from and flush with the upper surface thereof. The exposed portion of the stator lead member is plated with a metal having a low melting temperature, and the upper surface of the insulating frame is coated with an adhesive. Then, a ceramic dielectric body, which is provided at its lower side with a stator electrode, is placed on the adhesive layer. Subsequently, heat is applied to the ceramic dielectric body and the insulating frame while pressing them to each other so that the metal of the low melting point is molten to electrically connect the stator electrode and the stator lead member. The assembly is then cooled to solidify the metal of the low melting point, as well as the adhesive. Since the ceramic dielectric body is fixed to the frame by means of the adhesive, the steps of grinding and polishing of the stator electrode is eliminated advantageously.

5 Claims, 3 Drawing Figures

METHOD OF PRODUCING TRIMMER CAPACITORS

BACKGROUND OF THE INVENTION

The present invention relates to a trimmer capacitor, as well as to a method of producing the same, and, more particularly, to a trimmer capacitor and a method of producing the same making use of a ceramic as the dielectric body, the ceramic being composed mainly of titanium dioxide.

Trimmer capacitors having dielectric bodies composed mainly of ceramic are known. These trimmer capcitors are produced by a process as summarized below. Namely, a stator electrode, ceramic dielectric body and a rotor electrode are formed in layers on an insulating frame formed from a material such as plastic. A rotor shaft extends through the rotor electrode, ceramic dielectric body, and the stator electrode, and is carried rotatably by the frame. The rotor electrode and the ceramic dielectric body are fixed to the rotor shaft for rotation unitarily with the latter relative to the stator electrode. As the rotor shaft is rotated, the overlapping area of the rotor electrode and the stator electrode is changed to vary the capacitance.

A ceramic mainly composed of titanium dioxide ($TiO_2$) is preferred as the material for the dielectric body of the trimmer capacitor of the type described since it exhibits a specific dielectric constant which is practically about 10 to 1000 times as large as those of other ceramics and plastic films, and also has other superior electric characteristics. This ceramic, however, has only a small flexibility and is mechanically fragile. The mechanical defect is increased if barium titanate ($BaTiO_2$) is used for attaining a higher dielectric constant.

More specifically, the rotor electrode of the conventional trimmer capacitor of the type described is fabricated by applying in a substantially semi-circular pattern is silver paste or the like electrode material to a thin disc of ceramic which is inherently very fragile. In addition, the rotor electrode which is rotated together with the ceramic dielectric body is liable to be subjected to impacts. Thus, the thickness of the ceramic dielectric body may be reduced to an order of about 0.3 mm only. For those reasons, it has been extremely difficult to obtain a small-sized and high-performance trimmer capacitor having a high capacitance and wide range of capacitance.

SUMMARY OF THE INVENTION

It is, therefore, a major object of the invention to provide a trimmer capacitor which can remarkably facilitate the assembling, as well as a method of producing the same.

It is another object of the invention to provide a trimmer capacitor which can eliminate the steps of grinding and polishing the stator electrode.

It is still another object of the invention to provide a trimmer capacitor having a small dielectric loss.

It is a further object of the invention to provide a trimmer capacitor in which the thickness of the dielectric body is selected freely and made sufficiently thin to cover a wide range of capacitance from low to high capacitance values.

It is a still further object of the invention is to provide a trimmer capacitor having a sufficient strength against mechanical impact.

These and other objects, as well as advantageous features of the invention will become clear from the following description of the preferred embodiments taken in conjunction with the accompanying drawings.

DESCRIPTION OF THE PREFERRED EMBODIMENTS

Figure 1:
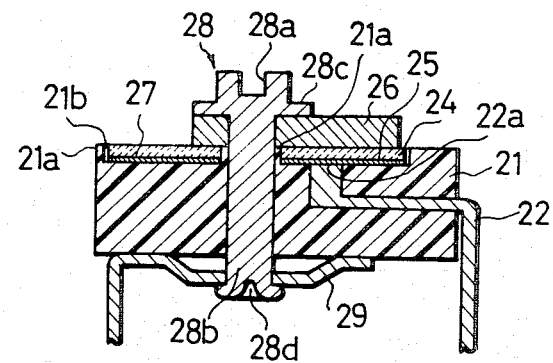
FIG. 1 is a sectional view of a trimmer capacitor in accordance with the invention.
Figure 2:
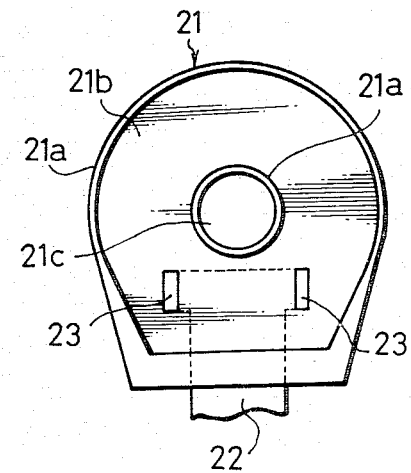
FIG. 2 is a top plan view of an insulating frame of a trimmer capacitor in accordance with the invention.

Referring to the drawings, a reference numeral 1 denotes an insulating frame made of plastic and formed by means of a molding process while a reference numeral 22 denotes a stator lead member which is fixed to the frame 21 by molding such that a portion thereof is exposed from the upper face of the frame 21.

A reference numeral 23 denotes a metal having a low melting point such as tin Sn, lead Pb or an Sn-Pb alloy, bonded to the exposed portion 22a of the stator lead member 22 by an electroplating or dip plating process.

A disc-shaped ceramic dielectric body 24 mainly composed of titanium dioxide is provided with a central bore 24a. A substantially semi-circular stator electrode 25 is formed by printing and baking a silver paste on the ceramic dielectric body. A reference numeral 26 denotes a substantially semi-circular rotor electrode overlying the ceramic dielectric body 24 in close contact with the ceramic dielectric body 24 for rotation relatively to the latter, while a reference numeral 27 denotes an auxiliary electrode for a height compensation. The rotor electrode 26 is fixed to a rotor shaft 28 for rotation therewith.

The rotor shaft 28 includes a minipulation portion 28a, a journal portion 28b, a disc portion 28c and a spinning caulked portion 28d. The journal portion 28b extends through the ceramic dielectric body 24 and the insulating frame 21 and projects outwardly of the latter, and is rotatably caulked at its holding portion 28d. A reference numeral 29 denotes a ground spring lead which is electrically connected to the rotor electrode 26 through the journal portion 28b extending therethrough.

An explanation will be made hereinunder as to a method of producing the trimmer capacitor in accordance with the invention.

After setting the stator lead member 22 in the plastic shaping mold, a plastic which is the material of the insulating frame 21 is charged into the mold in a manner well known as an insertion molding process, so as to form an insulating frame with a stator lead having a portion of the stator lead member 22 exposed substantially horizontally on the top surface of the insulating frame 21. The insulating frame 21 is so shaped as to have upstanding circular guide lips 21a and 21a between which is defined a recess 21b, and a bore 21c is formed at the center of the insulating frame.

Then, the aforementioned metal 23 of low melting point such as Sn, Pb or Sn-Pb alloy is bonded to the exposed portion 22a of the stator lead member by an electroplating or dip plating process.

Figure 3:
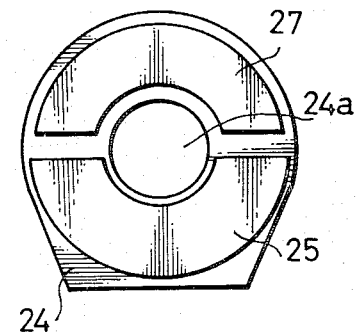
FIG. 3 is a bottom plan view of a ceramic dielectric body in a trimmer capacitor in accordance with the invention.

Meanwhile, the stator electrode 25 is formed to have a substantially semi-circular form, by printing and baking silver paste on a ceramic dielectric body 24 which is mainly constituted by $TiO_2$ and which exhibits good electric properties, thereby to prepare a ceramic dielectric body with stator electrode. (See FIG. 3)

It is preferred to form a semi-circular electrode 27 as an auxiliary electrode on the ceramic dielectric body 24 simultaneously with the formation of the stator electrode 25 in order to compensate for height.

Subsequently, the low melting point metal 23 bonded to the insulating frame with stator lead and the whole upper surface of the insulating frame 21 is coated with a film of a plastic adhesive in the liquid or solid state, the plastic being preferably of hot melt type and having a melting point lower than that of the aforementioned low melting point metal. The material of the plastic adhesive may be, for example, bismaleimidetriazine which is a kind of thermosetting plastic.

Thereafter, the dielectric body with stator electrode (See FIG. 3) is placed on the plastic adhesive with the stator electrode 25 directed downward, and is heated up to a temperature which is high enough to melt the low melting point metal 23 under application of pressure. By so doing, the stator electrode 25 and the exposed portion 22a of the stator lead member 22 are bonded to each other under the presence of the liquid adhesive and in electrical contact. Thereafter, the insulating frame 21 is gradually fastened to the ceramic dielectric body 24 and to the stator electrode 25 as a result of the setting reaction or solidification of the plastic adhesive.

Finally, the rotor shaft 28 to which the rotor electrode 26 is attached beforehand is fitted into the ceramic dielectric body 24, insulating frame 21 and the ground spring lead 29 and the projecting end of the rotor shaft 28 is caulked at the holding portion 28d in such a manner as to permit the rotor shaft 28 to rotate, so that a trimmer capacitor having a cross-sectional structure shown in FIG. 1 is produced. Then, as the manipulation portion 28a is rotated by means of a screw driver or the like, the substantially semi-circular rotor electrode 26 is rotated to vary the area of overlap between itself and the stator electrode 25 thereby to change the capacitance.

The present invention is not, of course, limited to the above-described embodiment; it may be modified in various ways within the scope of the appended claims.

What is claimed is:

1. A method of producing a trimmer capacitor of a type having a stator electrode, a ceramic dielectric body, a rotor electrode, and an insulating frame on which said stator electrode, ceramic dielectric body and said rotor electrode are mounted in layers, said rotor electrode being carried rotatably relatively to said stator electrode; said method comprising the steps of:

forming said insulating frame by means of insert molding in such a manner that a portion of a metallic stator lead member is exposed from and flush with the upper surface of said insulating frame;

plating said portion of said stator lead member exposed from the upper surface of said insulating frame with a metal having a low melting point;

applying an adhesive to the upper surface of said insulating frame;

placing a ceramic dielectric body provided at its lower side with a stator electrode on said adhesive applied to said insulating frame;

applying heat and pressure to melt said metal having a low melting point thereby to electrically connect said stator electrode and said stator lead member to each other; and effecting a cooling to solidfy said metal having a low melting point and said adhesive.

2. A method of producing a trimmer capacitor as claimed in claim 1, wherein said metal having a low melting point is tin.

3. A method of producing a trimmer capacitor as claimed in claim 1, wherein said metal having a low melting point is lead.

4. A method of producing a trimmer capacitor as claimed in claim 1, wherein said metal having a low melting point is an alloy of tin and lead.

5. A method of producing a trimmer capacitor as claimed in claim 1, wherein said adhesive is a plastic adhesive of hot metal type and has a melting point lower than that of said metal having a low melting point.

* * * * *